United States Patent [19]
Seaquist

[11] 3,737,558
[45] June 5, 1973

[54] EXPANSION ACCOMMODATING CONNECTOR FOR TUBULAR BUS BARS

[75] Inventor: James J. Seaquist, Birmingham, Ala.

[73] Assignee: Anderson Electric Corporation, Leeds, Ala.

[22] Filed: Mar. 13, 1972

[21] Appl. No.: 234,258

[52] U.S. Cl.....................174/86, 174/99 E, 339/9 E
[51] Int. Cl...........................................H02g 15/08
[58] Field of Search..................174/94 S, 99 E, 88 S, 174/88 B, 12 BH, 13; 339/9 E

[56] References Cited

UNITED STATES PATENTS

| | | | |
|---|---|---|---|
| 1,588,556 | 6/1926 | Thompson | 339/9 E |
| 1,759,567 | 5/1930 | Dibner | 174/94 S X |
| 1,967,340 | 7/1934 | Splunter | 174/99 E U |
| 2,269,493 | 1/1942 | Thomas | 174/99 E U |

Primary Examiner—Darrell L. Clay
Attorney—Harold J. Rathbun and Paul J. Rose

[57] ABSTRACT

A first fitting has a guide member receivable in an end portion of a tubular bus bar securable in a second fitting. Each fitting is provided with a pair of opposed flanges or connecting strap anchoring portions disposed radially outwardly of an installed tubular bus bar. The fittings are electrically interconnected by two pairs of flexible laminated connecting straps. Between the end portions, the straps of each pair are double-reversely curved oppositely to each other, and each strap of each pair is edgewise aligned with a corresponding strap of the other pair on an opposite side of an installed tubular bus bar. The first fitting may be provided either with a flat platform portion for bolting a flat bus bar thereto, or with a cylindrically recessed portion for welding a tubular bus bar thereto. The second fitting may be a single piece weldable to a tubular bus bar extending therethrough for engagement with the guide member on the first fitting, or it may be two pieces between which a tubular bus bar may be securely clamped.

10 Claims, 9 Drawing Figures

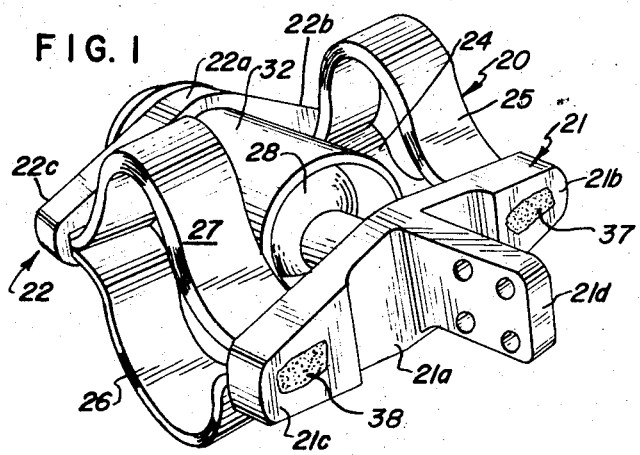
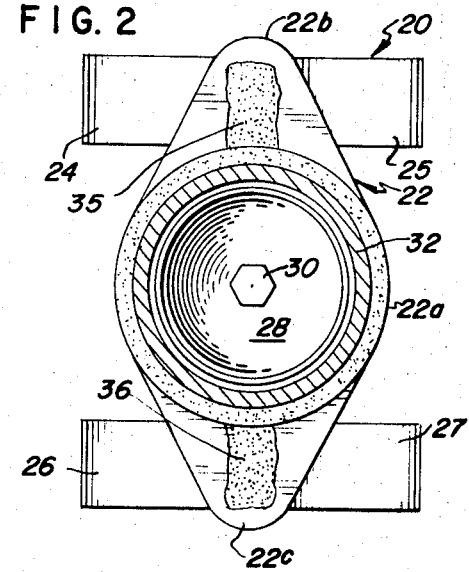
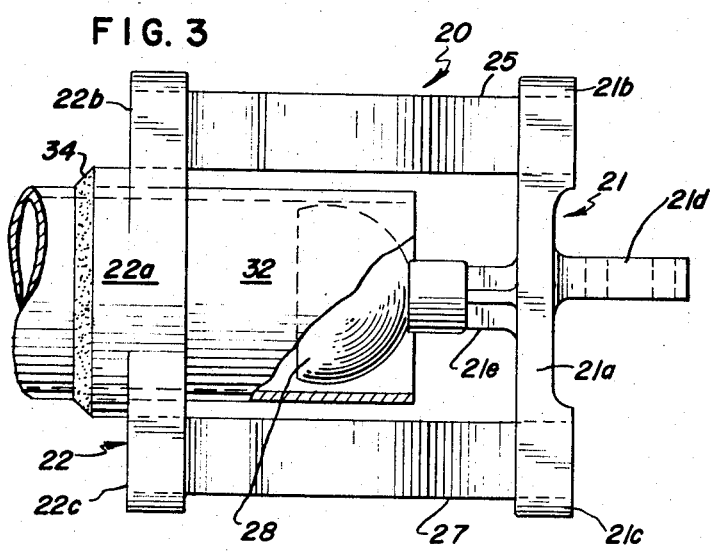
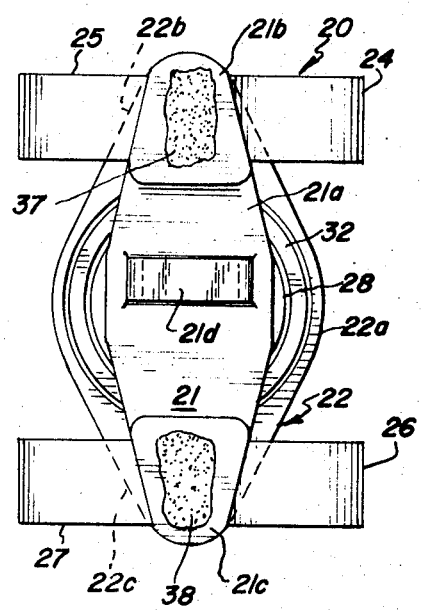
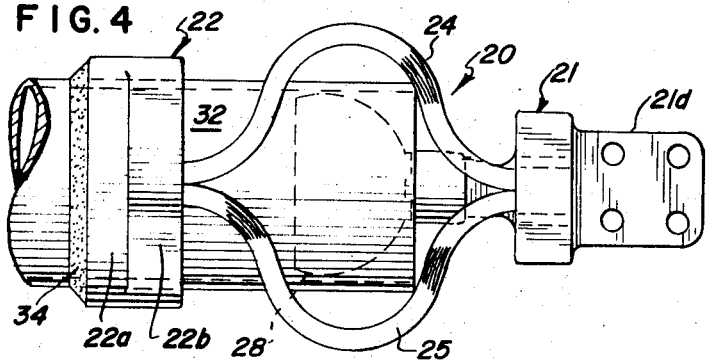

EXPANSION ACCOMMODATING CONNECTOR FOR TUBULAR BUS BARS

This invention relates generally to expansion accommodating connectors, and more particularly to expansion accommodating connectors for tubular bus bars in extra high voltage applications, such as in power generating plants.

In former expansion accommodating connectors for tubular bus bars, flexible laminated connecting straps have been arranged with a flat side, as opposed to an edge, facing the tubular bus bar. In the more compact arrangement of this invention, edges of the connecting straps face the tubular bus bar.

An object of the invention is to provide an improved expansion accommodating connector for tubular bus bars.

Another object is to provide an expansion accommodating connector for tubular bus bars, the connector being capable of operation at higher voltages than former connectors and yet being substantially just as compact if not more so.

Other objects will appear when the following description is considered along with the accompanying drawings in which:

FIG. 1 is a perspective view of an expansion accommodating connector constructed in accordance with the invention and showing a portion of a tubular bus bar installed therein;

FIG. 2 is an end elevational view of the connector and bus bar portion of FIG. 1 taken from the left-hand side of FIG. 3;

FIG. 3 is a side elevational view of the connector and bus bar portion of FIG. 1;

FIG. 4 is a top plan view of the connector and bus bar portion of FIG. 1;

FIG. 5 is an end elevational view of the connector and bus bar portion of FIG. 1 taken from the right-hand side of FIG. 3;

Figure 6:
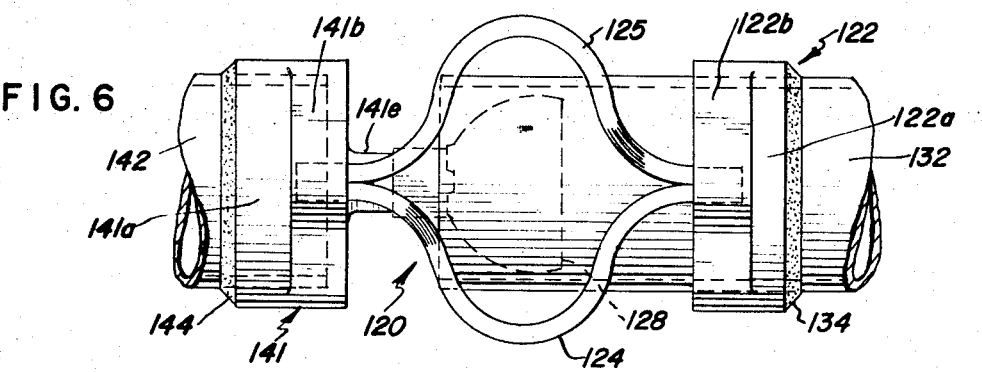
FIG. 6 is a top plan view of another expansion accommodating connector constructed in accordance with the invention and showing portions of two tubular bus bars installed therein.

With reference to the drawings, an expansion accommodating connector 20 constructed in accordance with the invention is shown in FIGS. 1-5. The connector 20 includes a first fitting 21 and a second fitting 22 joined by an upper pair of flexible laminated connecting straps 24 and 25 and a lower pair of flexible laminated connecting straps 26 and 27. The fitting 21 includes a main body portion 21a elongated to provide a pair of opposed connecting strap anchoring portions 21b and 21c. A flat platform portion 21d projects from one side of the main body portion 21a and is suitably apertured for bolting to a flat bus bar (not shown) leading to a terminal of electrical apparatus such as a generator or transformer. A post portion 21e projects from the other side of the main body portion 21a and has a guide member 28 substantially in the form of a hollow hemisphere secured to the free end portion thereof by a screw 30 (FIG. 2). The post portion 21e is cylindrical at its free end portion and has a cross-shaped cross section at its base.

The fitting 22 includes a hollow cylindrical body portion 22a having a pair of oppositely extending flanges or connecting strap anchoring portions 22b and 22c. In the use of the connector 20, an end portion of a tubular bus bar 32 is inserted through the cylindrical body portion 22a and over the guide member 28 secured to the fitting 21. The bus bar 32 is then secured to the fitting 22 by a weld 34 (FIGS. 3 and 4).

Each of the flexible laminated connecting straps 24, 25, 26, and 27 may consist of fourteen flatwise stacked strips of aluminum alloy each about one-thirty second of an inch thick, collectively provided with a double reverse curvature as shown between straight opposite end portions which are mounted respectively in the fittings 21 and 22. The connecting strap anchoring portions 21b and 22b are provided respectively with suitable apertures for respectively receiving opposite end portions of the pair of connecting straps 24 and 25, and the connecting strap anchoring portions 21c and 22c are provided respectively with suitable apertures for respectively receiving opposite end portions of the pair of connecting straps 26 and 27. Welds 35 and 36 (FIG. 2) secure the straps in the fitting 22, and welds 37 and 38 (FIG. 5) secure the straps in the fitting 21.

Upon relative movement of the tubular bus bar 32 and the fitting 21 toward and away from each other due to expansion and contraction caused by temperature changes, the straps 24, 25, 26, and 27 flex and the tubular bus bar 32 reciprocates on the guide member 28.

FIG. 6 shows an expansion accommodating connector 120 constructed in accordance with the invention. The connector 120 is for joining two tubular bus bars 132 and 142 and includes a fitting 122 identical to the fitting 22 of FIGS. 1-5. An end portion of the bus bar 132 is inserted through a hollow cylindrical body portion 122a of the fitting 122 and over a guide member 128 secured to a post portion 141e of a fitting 141. The bus bar 132 is then secured to the fitting 122 by a weld 134. The body portion 122a has a pair of oppositely extending flanges or connecting strap anchoring portions identical to the portions 22b and 22c of the fitting 22, only one such portion 122b being shown. The fitting 141 is similar to the fittings 22 and 122, but instead of a hollow cylindrical body portion with a hole extending completely therethrough, a cylindrical body portion 141a of the fitting 141 has a cylindrical recess therein in which the tubular bus bar 142 is received. The bus bar 142 is secured to the fitting 141 by a weld 144. The recess in which the bus bar 142 is received is closed at its inner end by a portion of the body portion 141a which supports the post portion 141e. The body portion 141a has a pair of oppositely extending flanges or connecting strap anchoring portions identical to the portions 22b and 22c of the fitting 22, only one such portion 141b being shown. The fittings 122 and 141 are joined by an upper pair of flexible laminated connecting straps 124 and 125 identical to the connecting straps 24 and 25 and by a lower pair of flexible laminated connecting straps (not shown) identical to the connecting straps 26 and 27.

Figure 7:
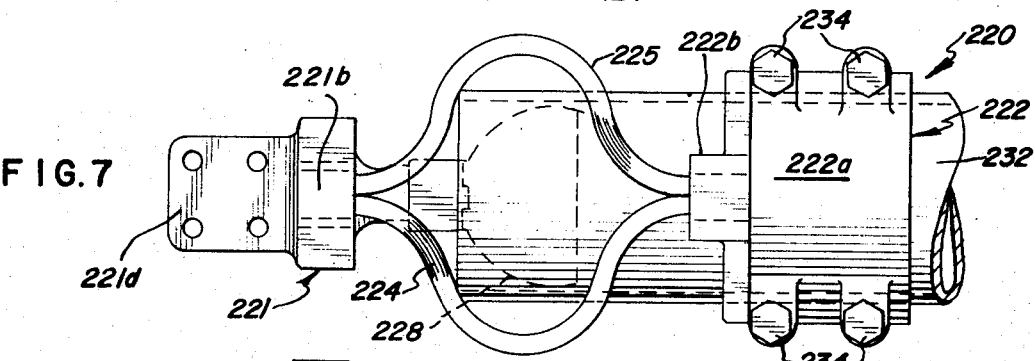
FIG. 7 is a top plan view of still another expansion accommodating connector constructed in accordance with the invention and showing a portion of a tubular bus bar installed therein.
Figure 8:
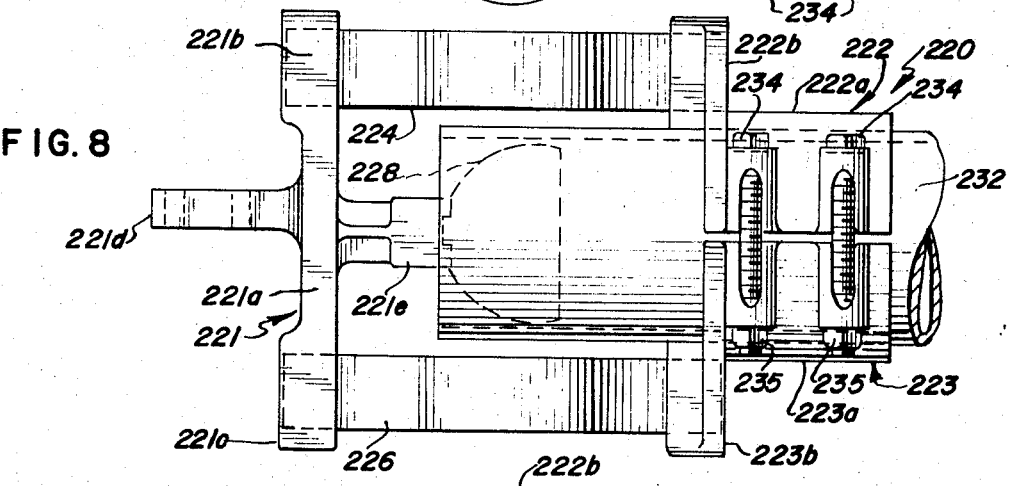
FIG. 8 is a side elevational view of the connector and bus bar portion of FIG. 7.
Figure 9:
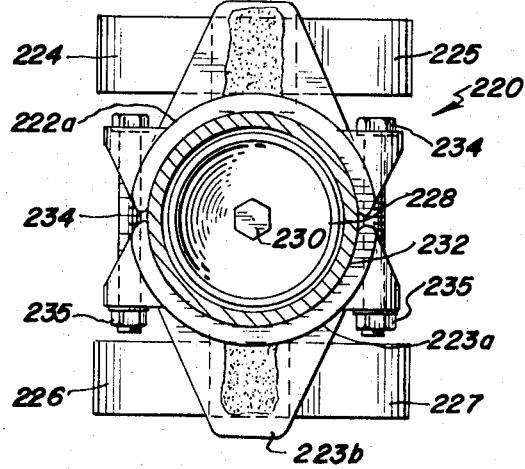
FIG. 9 is an end elevational view of the connector and bus bar portion of FIG. 7 taken from the right-hand side of FIG. 8.

FIGS. 7, 8, and 9 show an expansion accommodating connector 220 constructed in accordance with the invention. The connector 220 is similar to the connector 20, but a tubular bus bar 232 may be clamped therein, instead of having to be welded therein as the tubular bus bar 32 is welded in the connector 20. The connector 220 includes a fitting 221 having a main body portion 221a, opposed connecting strap anchoring portions 221b and 221c, a platform portion 221d, and a post portion 221e, identical respectively to the main body portion 21a, connecting strap anchoring portions 21b and 21c, platform portion 21d, and post portion 21e of the fitting 21. The tubular bus bar 232 is clampable between two identical half-fittings 222 and 223 respectively having generally hollow semi-cylindrical body portions 222a and 223a embracing the tubular bus bar 232 and flanges or connecting strap anchoring portions 222b and 223b. The fitting 221 is joined to the half-fitting 222 by an upper pair of flexible laminated connecting straps 224 and 225 identical to the connecting straps 24 and 25, and is joined to the half-fitting 223 by a lower pair of flexible laminated connecting straps 226 and 227 identical to the connecting straps 26 and 27. A guide member 228 identical to the guide member 28 is secured to the post portion 221e of the fitting 221 by a screw 230. Each of the body portions 222a and 223a is provided with four apertured lug portions for respectively receiving bolts 234 which cooperate respectively with nuts 235 to clamp the half-fittings 222 and 223 together and the tubular bus bar 232 therebetween.

Various modifications may be made in the structures shown and described without departing from the spirit and scope of the invention as set forth in the appended claims.

I claim:

1. An expansion accommodating connector for tubular bus bars comprising a pair of spaced fittings each having a main body portion and a pair of connecting strap anchoring portions extending oppositely therefrom, the main body portion of one of the fittings being substantially a hollow open-ended cylindrical portion in which an end portion of a tubular bus bar may be received and secured, a guide member secured to the main body portion of the other of the fittings and reciprocably received in an end portion of a tubular bus bar when a tubular bus bar is secured in the one fitting, the connecting strap anchoring portions of each of the fittings being aligned respectively with those of the other fitting and disposed radially outwardly of a tubular bus bar when a tubular bus bar is secured in the one fitting, and two pairs of flexible laminated connecting straps electrically interconnecting the fittings, each strap of each pair having one end portion secured to one of the connecting strap anchoring portions of the one fitting along with one end portion of the other strap of the pair, each strap of each pair having another end portion secured to a corresponding one of the connecting strap anchoring portions of the other fitting along with another end portion of the other strap of the pair, and each strap of each pair being edgewise aligned with a corresponding strap of the other pair.

2. An expansion accommodating connector as claimed in claim 1 wherein the the one fitting is a one-piece fitting.

3. An expansion accommodating connector as claimed in claim 1 wherein the one fitting comprises two half-fittings and clamping means for clamping a tubular bus bar therebetween.

4. An expansion accommodating connector as claimed in claim 1 wherein the other fitting includes a platform portion to which a flat bus bar may be secured.

5. An expansion accommodating connector as claimed in claim 1 wherein the main body portion of the other fitting is provided with a cylindrical recess in which an end portion of another tubular bus bar may be received and secured.

6. An expansion accommodating connector as claimed in claim 1 wherein each strap of each pair is double-reversely curved oppositely from the other strap of the pair.

7. An expansion accommodating connector as claimed in claim 6 wherein the one fitting is a one-piece fitting.

8. An expansion accommodating connector as claimed in claim 6 wherein the one fitting comprises two half-fittings and clamping means for clamping a tubular bus bar therebetween.

9. An expansion accommodating connector as claimed in claim 6 wherein the other fitting includes a platform portion to which a flat bus bar may be secured.

10. An expansion accommodating connector as claimed in claim 6 wherein the main body portion of the other fitting is provided with a cylindrical recess in which an end portion of another tubular bus bar may be received and secured.

* * * * *